United States Patent [19]

Seike et al.

[11] Patent Number: 5,518,255

[45] Date of Patent: May 21, 1996

[54] CARBON-BASED COMPOSITE CERAMIC SEALING MATERIAL

[75] Inventors: Shoji Seike, Nagoya; Toshiichi Ikami, Konan; Kazuo Ohta; Shunichi Kiyosawa, both of Tokyo, all of Japan

[73] Assignees: NGK Insulators, Ltd.; Tokyo Electric Power Services Co., Ltd., both of Japan

[21] Appl. No.: 68,674

[22] Filed: May 28, 1993

Related U.S. Application Data

[63] Continuation-in-part of Ser. No. 34,833, Mar. 17, 1993, abandoned.

[30] Foreign Application Priority Data

Jun. 1, 1992 [JP] Japan .................................. 4-166975
Jun. 1, 1992 [JP] Japan .................................. 4-166976

[51] Int. Cl.⁶ .............................. F16J 15/26; F16J 15/30
[52] U.S. Cl. .......................... 277/102; 277/123; 277/227; 277/229
[58] Field of Search .................... 277/102, 123, 277/124, 125, 227, 229, 226, 235 A

[56] References Cited

U.S. PATENT DOCUMENTS

| | | | |
|---|---|---|---|
| 778,430 | 12/1904 | Stewart | 277/227 |
| 779,480 | 1/1905 | Johnston | 277/226 X |
| 861,127 | 7/1907 | Kleckner | 277/102 |
| 926,676 | 6/1909 | Morrison | 277/226 X |
| 1,056,010 | 3/1913 | Dailey | 277/226 X |
| 1,580,212 | 4/1926 | McKeon et al. | 277/102 |
| 2,282,466 | 5/1942 | Etzkorn | 277/227 |
| 2,396,825 | 3/1946 | Burroughs | 277/227 |
| 2,404,952 | 7/1946 | Fiechter | 277/227 |
| 2,717,024 | 9/1955 | Jelinek | 277/229 |
| 3,529,836 | 9/1970 | Hyde | 277/102 X |
| 3,607,226 | 9/1971 | Burlingame | 75/44 R |
| 3,854,929 | 12/1974 | Stewart et al. | 75/1 |
| 4,600,202 | 7/1986 | Schaeffler et al. | 277/53 |
| 5,014,917 | 5/1991 | Sirocky et al. | 277/229 X |

FOREIGN PATENT DOCUMENTS

| | | | |
|---|---|---|---|
| 2308843 | 11/1976 | France | 277/227 |
| 2344765 | 10/1977 | France . | |
| 0575156 | 4/1933 | Germany | 277/228 |
| 1675368 | 1/1971 | Germany . | |
| 2711399 | 9/1978 | Germany | 277/228 |
| 3429708 | 1/1986 | Germany . | |
| 3445805 | 5/1986 | Germany . | |
| 3-117783 | of 1991 | Japan . | |
| 3-281592 | of 1991 | Japan . | |
| 11117 | of 1890 | United Kingdom | 277/226 |
| 0024049 | of 1902 | United Kingdom | 277/102 |
| 204804 | 10/1923 | United Kingdom | 277/226 |
| 2077246 | 12/1981 | United Kingdom . | |

*Primary Examiner*—William A. Cuchlinski, Jr.
*Assistant Examiner*—John L. Beres
*Attorney, Agent, or Firm*—Parkhurst, Wendel & Burr

[57] ABSTRACT

A sealing member, comprising a discrete material including a plurality of individual pellets, each pellet comprising a core and a carbon based coating thereon, the plurality of individual pellets being aggregated and pressed together. Additionally, a method for forming the sealing member is provided.

19 Claims, 6 Drawing Sheets

FIG_1A PRIOR ART
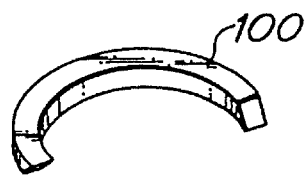
FIG_1B PRIOR ART
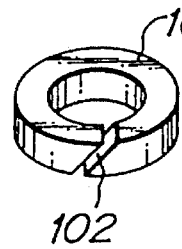
FIG_1C PRIOR ART
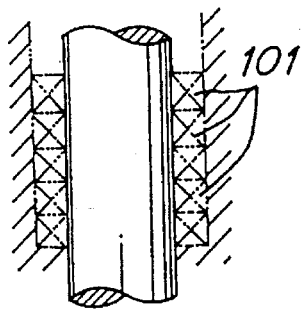
FIG_2
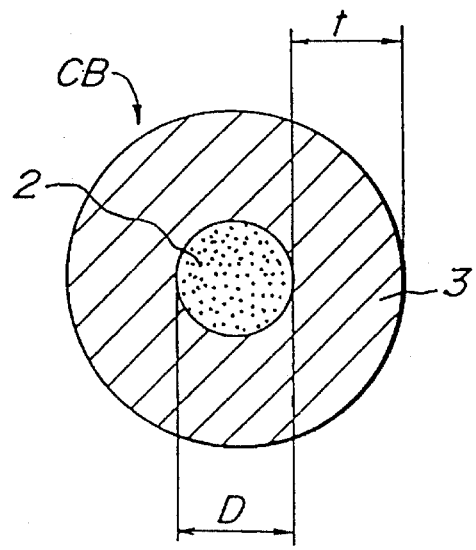

FIG_4A
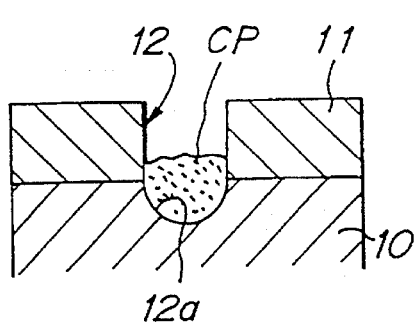
FIG_4B
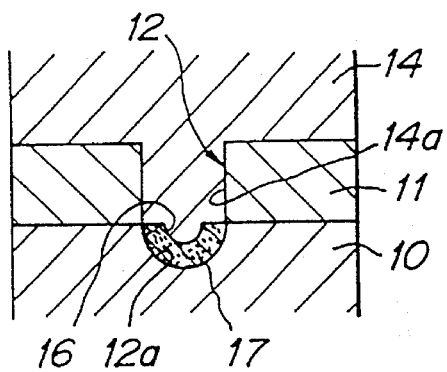
FIG_4D
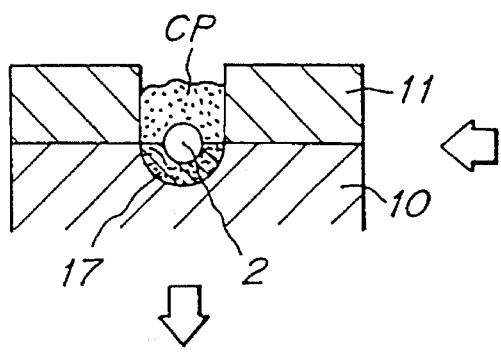
FIG_4C
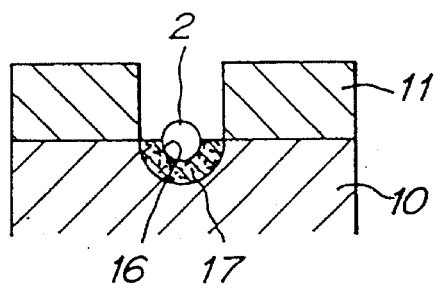
FIG_4E
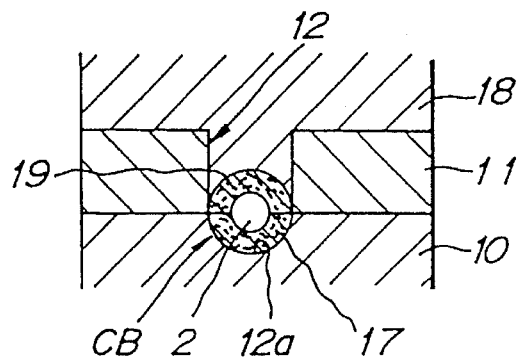

FIG_5A
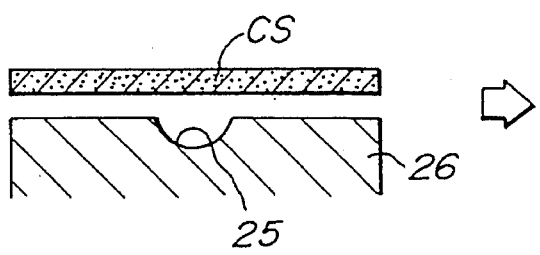
FIG_5B
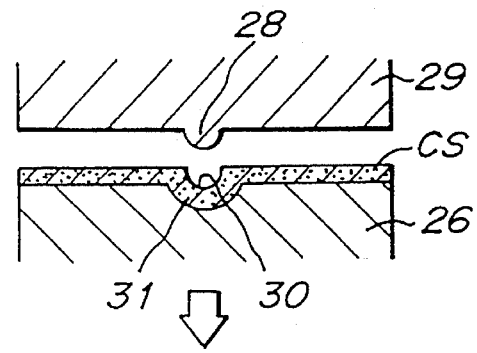
FIG_5D
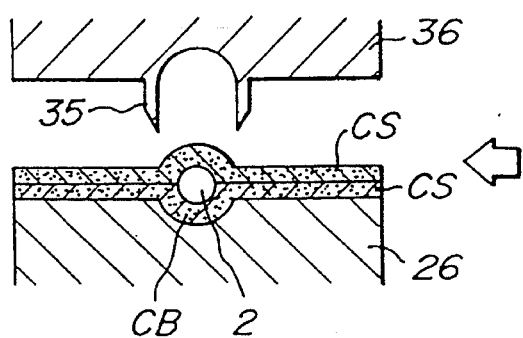
FIG_5C
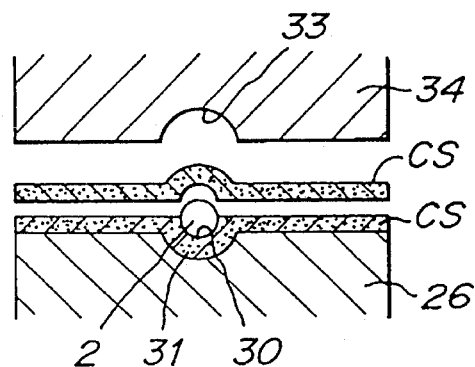
FIG_6
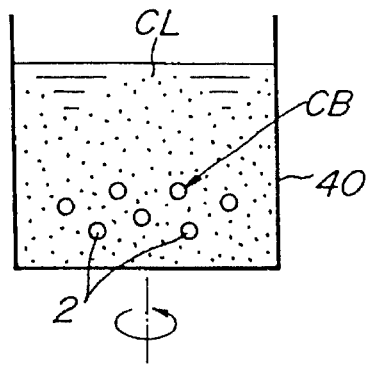

FIG._7A
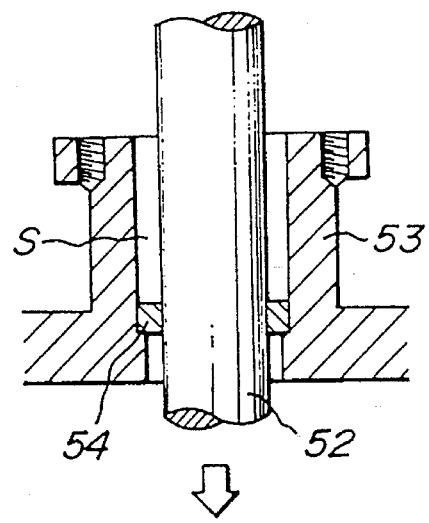
FIG._7B
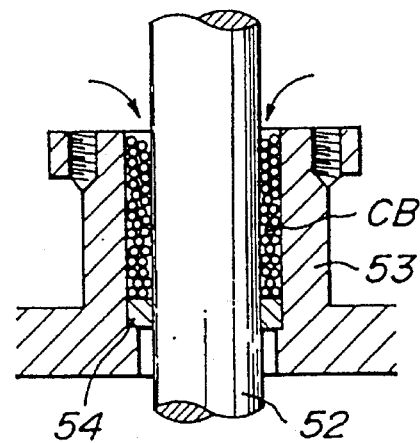
FIG._7C
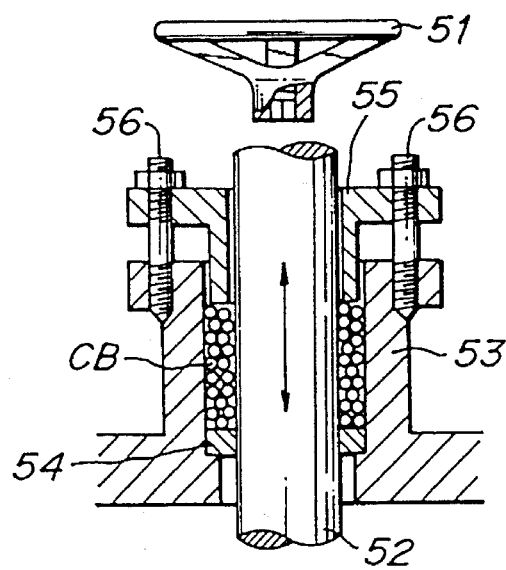

FIG_8
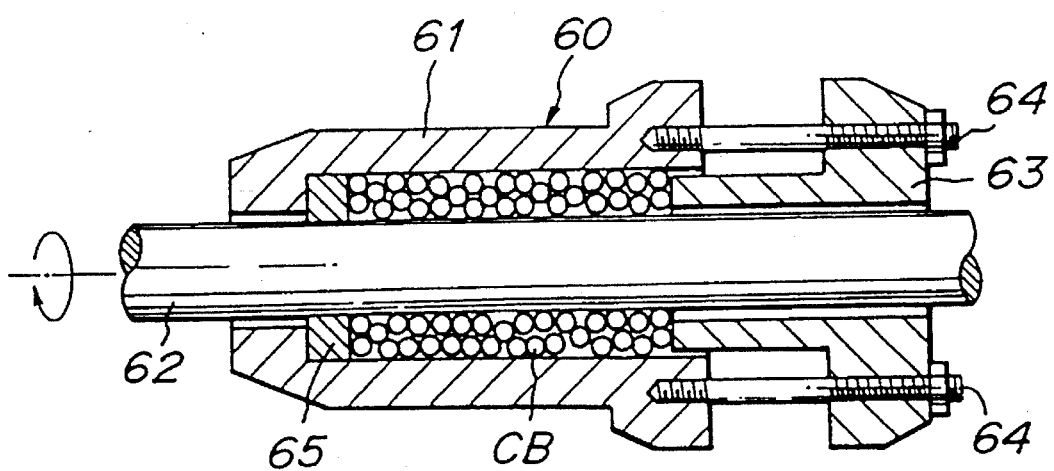

CARBON-BASED COMPOSITE CERAMIC SEALING MATERIAL

This application is a continuation-in-part of the application Ser. No. 08/034,833 filed Mar. 17, 1993 now abandoned.

BACKGROUND OF THE INVENTION (1) Field of the Invention

The present invention relates to sealing members to be used in various valves, various pumps and the like, and a process for the formation of such sealing members. The invention also relates to discrete composite ceramic materials comprising pellets which are granular or flaky, and a method for the production thereof.

(2) Related Art Statement

As sealing members for high temperature-high pressure steam valves to be used in thermal power plants, nuclear power plants or the like, coil packings produced by treating asbestos threads with a heat-resistive lubricant and graphite and shaping the thus treated threads in a rectangular section, have been conventionally used, as shown in FIGS. 1A–1C. Coil packing 101 is formed by curving a sealing member 100 shown in FIG. 1A into a circular shape shown in FIG. 1B. Accordingly, a cut 102 exists at one location. A sealing member is formed by stacking a plurality (for example, five to ten) of coil packings as shown in FIG. 1C such that phases of the cuts 102 are staggered from one another, and pressing the piled coil packings with a pressing member (not shown).

However, such a conventional sealing member has the following problems.

(1) First, asbestos is considered a carcinogenic material, and therefore use of asbestos is undesirable for environmental sanitation reasons.

(2) Since the heat-resistive lubricant is consumed over time, the sealing member needs tightening or frequent replacement.

(3) Since many kinds and sizes of valves are used in thermal power plants, nuclear power plants or the like, many kinds of sealing members (packings) having different diameters need to be prepared. However, it is troublesome to control a great many sizes of sealing members, and incorrect selection of the proper sizes is likely unless great care is paid during fitting of the sealing members.

(4) Since a cut is present in one location of the sealing member, it is necessary to carefully set a plurality of such sealing members so that the cuts do not overlap. Such a setting method is difficult and time-consuming. If the sealing members are improperly set, leakage of steam may result.

On the other hand, when discrete ceramic materials made up of granular or flaky ceramic pellets (e.g., alumina) have been used for given purposes, such ceramic materials exhibit typical ceramic features such as heat resistivity and corrosion resistance. However, since such ceramics have great friction resistance, they can be used for limited purposes only, and their use as a sealing member is prohibitive.

SUMMARY OF THE INVENTION

One objective of the present invention is to provide a sealing member which can easily form a sealed portion, without using asbestos and while overcoming the need to control various sizes of the sealing members. The invention also provides a method for producing a seal.

Further, the present invention provides composite ceramic materials which have superior physical properties such as friction resistance, while maintaining heat resistance, corrosion resistance and the like possessed by the ceramics. The invention also provides a method for producing such composite ceramic materials.

The sealing member according to the first aspect of the present invention comprises a discrete material of a number of small pellets collected together in a pressed state, at least a surface portion of each of the small pellets being composed of a carbon based material. Graphite is preferably used as the carbon based material. Pressed natural graphite is preferably used, since it has a high swelling property and high sealing performance. The pellets may entirely be composed of the carbon base material. However, it is preferable that an inner, core portion consist of a ceramic (e.g., a ceramic grain) a metal (e.g., iron or lead), a plastic (e.g., FRP), carbon (e.g., artificial graphite), or a composite material thereof and that the outer portion surrounding the core consist of the carbon base material.

The method for producing the sealed portion comprises the steps of filling a discrete material in a space in which a sealing member is to be arranged, at least a surface portion of the pellets thereof being composed of a carbon base material, and pressing discrete materials, whereby that space is sealed. As the carbon base material, graphite is preferably used. Preferably, the above mentioned discrete material comprising composite pellets is used. The sealing member and the method for the formation of the sealed portion according to the present invention are favorably applied to a space between a stationary member and a movable member, and may be used in, for example, sealing for high temperature-high pressure steam valves, etc. in a thermal power plant.

Since a number of the small pellets, at least a surface portion of which is composed of the carbon base material, are pressed in the above sealing member and the above sealed portion-forming method, the small pellets adhere to each other to provide a seal, thereby preventing troubles such as leakage of high pressure steam at high temperature.

The carbon base material may include an interlaminar compound, an insertion compound, graphite oxide and the like of graphite. The composite pellets may be of various shapes, for example granular or flaky (planar). Among them, the granular shape is typical.

As the method for producing the above discrete composite ceramic material, any one of following methods (1) through (4) may be used.

(1) A binder is attached to ceramic particles having a granular shape or the like, and a carbon base material is attached thereto by the binder. These steps are repeated as necessary to provide an adequately thick coating of carbon-base material.

(2) A powdery carbon base material is press molded to produce an intermediate molding having depressions, and ceramic particles are fitted into the depressions of the intermediate molding. Additional powdery carbon base material is placed on the intermediate molding to which the ceramic particles are fitted, and the additional carbon base material is press molded such that the ceramic particles are completely coated by the carbon base material.

(3) Sheets of carbon base material are press molded, and ceramic particles are interposed between first and second sheets made of the carbon base material, while an adhesive is applied between the first and second sheets. In this state, the laminate including the discrete ceramic material therein is press molded to produce a composite sheet-like molding in which the discrete ceramic material is surrounded. A laminated portion of the composite sheet-like molding containing the discrete ceramic material is separated by cutting.

(4) Discrete ceramic material is placed in a container in which a fluidic carbon base material is placed, and the carbon base material inside the container is attached to a surface of the particles of the discrete ceramic material.

According to the present invention, the ceramic particles function as cores, while surface roughness thereof is improved and friction resistance thereof is reduced by the coating of the carbon base material, as compared to the discrete ceramic material without a coating.

According to the discrete composite ceramic material-producing method of the present invention, the discrete ceramic material is coated with the powdery carbon base material by encapsulating the ceramic particles of the discrete ceramic material with the carbon base material through the binder [Method (1)], by encapsulating the ceramic particles of the discrete ceramic material in the powdery carbon base material by press molding [Method (2)], by sandwiching the ceramic particles of the discrete ceramic material between the sheets made of the carbon base material and separating the sandwiched portion of the resulting laminate by cutting [Method (3)], or by placing the ceramic particles of the discrete ceramic material in the container in which the fluid or semi-fluid carbon base material is charged and encapsulating the particles of the discrete ceramic material with the carbon base material [Method (4)].

These and other objects, features and advantages of the invention will be appreciated upon reading of the following description of the invention when taken in conjunction with the attached drawings, with the understanding that some modifications, variations and changes of the same could be made by the skilled person in the art to which the invention pertains without departing from the spirit of the invention or the scopes of claims appended hereto.

BRIEF DESCRIPTION OF THE ATTACHED DRAWINGS

For a better understanding of the invention, reference is made to the attached drawings, wherein:

FIGS. 1A, 1B and 1C are views illustrating a packing as a conventional sealing member and a state in which the packing is used;

FIG. 2 is a sectional view of a composite ceramic pellet in granular form as one embodiment of the present invention;

FIGS. 4A, 4B, 4C, 4D and 4E are flow diagrams for illustrating a second embodiment of the method for producing the discrete composite ceramic material according to the present invention;

FIGS. 5A, 5B, 5C and 5D are flow diagrams for illustrating a third embodiment of the method for producing the discrete composite ceramic material according to the present invention;

FIG. 6 is a diagram for illustrating a fourth embodiment of the method for producing the discrete composite ceramic material according to the present invention;

FIGS. 7A, 7B and 7C are flow diagrams for illustrating an example of the method for the formation of a sealed portion together with a sealing member of the invention; and FIG. 8 is a sectional view illustrating a case where a sealed portion according to the present invention is applied to a seal for a pump.

DETAILED DESCRIPTION OF THE INVENTION

Discrete composite ceramic material is a preferred example of the present invention. A pellet of the discrete composite ceramic material is shown in FIG. 2. The pellet CB includes a substantially spherical ceramic grain surrounded with graphite layer 3 as a carbon base material in a spherical-cell shape. The ceramic grain may be composed mainly or essentially of porcelain, alumina (aluminum oxide), silicon nitride, zirconia, carbon or the like. The diameter of the composite pellet is preferably less than 15 mm, more preferably 1 to 12 mm, and most preferably about 1 to about 5 mm. The compression strength of the ceramic grain is preferably not less than 500 kg/cm$^2$ and more preferably not less than 1,000 kg/cm$^2$. The ceramic grains are sintered bodies and preferably have a diameter not less than 0.5 mm.

The graphite layer 3 is preferably composed of natural graphite or artificial graphite, and the thickness of the graphite layer 3 may be appropriately set depending upon use. For example, when the discrete ceramic material is to be used for a sealing member, the thickness t of the graphite layer is preferably substantially equal to or greater than one-half the diameter D of the ceramic grain 2.

Figure 3A:
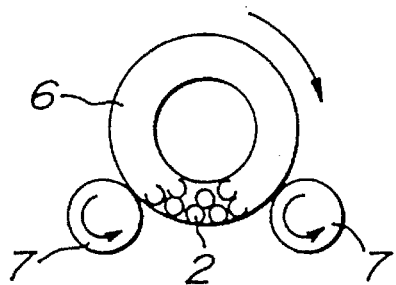
FIGS. 3A, 3B and 3C are flow diagrams for illustrating a first embodiment of the method for producing the discrete composite ceramic material according to the present invention.
Figure 3B:
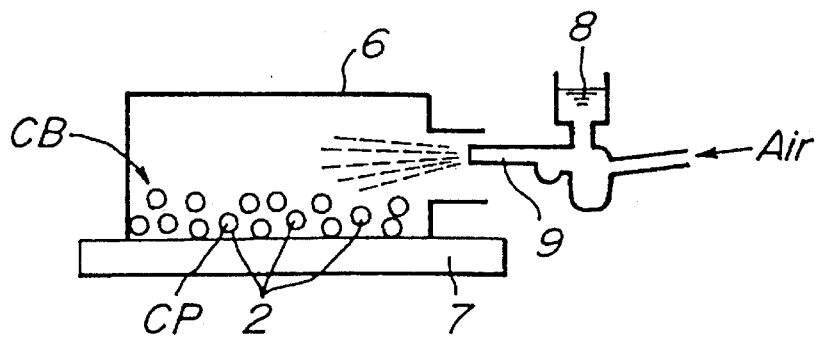
Figure 3C:
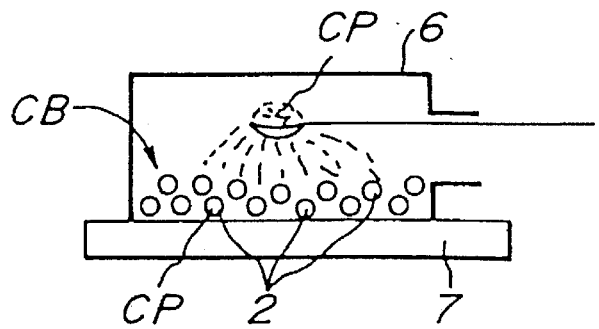

Next, methods for producing such discrete ceramic materials according to the present invention will be explained as follows:

FIGS. 3A through 3C depict a production method using a granulating process with powdery graphite. As shown in FIGS. 3A and 3B, a considerable number of ceramic grains 2 are charged into a vessel 6 having a circular section, and the vessel 6 is rotated through rotating rollers 7. While the vessel 6 is being rotated, a binder 8 (may be organic, inorganic, or any other appropriate binder material) is attached to the ceramic grains 2 rolling on the inner peripheral surface of the vessel 6 by spraying the binder 8 into the vessel 6 through a sprayer 9. Then, as shown in FIG. 3C, while the vessel 6 is being rotated, graphite powder CP is sprayed onto the ceramic grains 2 rolling inside the vessel 6. Thereby, graphite powder CP is attached to the surfaces of the ceramic grains 2 by the binder 8. The attached amount of the graphite powder onto the surfaces of the ceramic grains can be adjusted by repeating the steps (B) and (C), as appropriate. Consequently, a discrete composite ceramic material composed of pellets CB can be obtained, which are coated with the graphite powder CP in a given thickness.

FIGS. 4A through 4E depict another production method in which graphite powder is press molded. As shown in FIG. 4A, a lower mold 10 and an intermediate mold 11 are set, and graphite powder CP is charged into a cavity 12 having a semi-spherical depression 12a as a bottom surface. Then, as shown in FIG. 4B, the fed graphite powder CP is press molded by first upper mold 14. In the first upper mold 14 is formed a semi-spherical projection 14a having a radius smaller than that of the semi-spherical depression 12a of the cavity 12. Thus, when the graphite powder is press molded with first upper mold 14, a semi-spherical intermediate molding 17 having a semi-spherical depression 16 in a central portion is obtained.

As shown in FIG. 4C, the first upper mold 14 is removed, and a ceramic grain 2 is placed into the semi-spherical depression 16 of the intermediate molding 17. Further, as shown in FIG. 4D, graphite powder CP is additionally fed onto the ceramic grain 2, and then, as shown in FIG. 4E, the secondly fed graphite powder CP is pressed by means of second upper mold 18, which is differently shaped from first upper mold 14. The second mold 18 is formed with a semi-spherical depression 19 which serves to define a single spherical space with the semi-spherical depression 12a of the cavity 12. When the graphite powder is press molded with the upper mold 18, an upper semi-spherical portion is formed to produce a composite ceramic pellet CB having the ceramic grain 2 buried in a central portion thereof. Thereafter, the upper mold 18 and the intermediate mold 11 are removed, and the composite ceramic pellet CB is taken out from the lower mold 10.

FIGS. 5A through 5D depict another production process in which sheet-like members are press molded. As shown in FIG. 5A, a first, flat graphite sheet CS is set on a lower mold 26 having a semi-spherical depression 25. Thereafter, the first graphite sheet CS is press molded by an upper mold 29 having a semi-spherical projection 28, thereby forming a semi-spherical graphite portion 31 on which a semi-spherical depression 30 is formed. Two graphite sheets CS are employed. As shown in FIG. 5C, a spherical ceramic grain 2 is set in the semi-spherical depression 30 of one graphite sheet CS, and a given adhesive is applied onto the graphite sheet CS. Thereafter, a second graphite sheet CS is placed on the first graphite sheet CS, and the laminated graphite sheets are press molded by using an upper mold 34 having a semi-spherical depression 33. Thereby, the ceramic grain 2 is held between the two graphite sheets CS in a sandwiched fashion. Then, as shown in FIG. 5D, a laminated portion having the ceramic grain 2 buried in a central portion is cut under pressure by using another upper mold 36 having a cylindrical cutting portion 35, and taken out as a small, discrete pellet.

FIG. 6 depicts another production method. In this method, ceramic grains 2 are fed into a vessel 40 in which fluid graphite CL is placed (if necessary, an appropriate binder is added), and graphite CL is attached onto surfaces of the ceramic grains 2. The graphite can be uniformly attached to the ceramic grains 2 by vibrating, revolving or rotating the vessel 40 as in a barrel vessel. The ceramic grains 2 onto which graphite CL is attached is taken out from the vessel 40. The coating steps may be repeated in the vessel 40 through a drying step therebetween. Thereby, discrete composite ceramic materials comprising pellet CB coated with graphite CL in a given thickness are obtained.

In the discrete composite ceramic material obtained by any of the above various methods, the ceramic grain 2 positioned in the central portion functions as a dense core having high compressive strength, whereas the graphite layer 3 on the outer peripheral side functions to reduce a coefficient of friction. Such discrete composite ceramic materials may be used for sealing members.

FIGS. 7A through 7C depict, by way of example, a sealing member and a sealed portion-forming method according to the present invention, using the thus obtained discrete composite ceramic material. This is an example of application to a sealing portion of a high temperature-high pressure steam valve in a thermal power plant. When handle 51 in FIG. 7C is turned, a valve shaft 52 provided inside a seal casing 53 axially moves to open or close a steam path and control a flow rate thereof. The discrete composite ceramic material comprising pellets CB, as shown in FIG. 2 is used to effect sealing between the cylindrical seal casing 53 on a stationary side and the valve shaft 52 on a movable side.

An end ring 54 is arranged on one end of the seal casing 53, and a short cylindrical flanged pressing member 55 is tightened toward the other end by means of bolts 56. In order to form a sealed portion, as shown in FIG. 7A, the bolts 56 are detached, and the pressing member 55 is removed. Then, as shown in FIG. 7B, a given amount of the discrete composite ceramic material is charged into and fully filled in a cylindrical sealing space S in which the sealed portion is to be formed. In this state, considerable gaps exist among a number of the small pellets CB. Thus, as shown in FIG. 7C, the pressing member 55 is fitted into the cylindrical space between an inner peripheral surface of the seal casing 53 and an outer peripheral surface of the valve shaft 52, and the small pellets CB are tightly adhered to one another by being pressed between an end face of the pressing member 55 and the end ring 54 through tightening the bolts 56. At that time, a tightening plane pressure of the pressing member 55 is set at, for example, 200 to 500 kgf/cm$^2$.

Leakage of high pressure and high temperature steam, hot water or the like can be prevented by the formation of the sealing member composed of the small composite ceramic pellets collected under pressure. In this case, the ceramic grain 2 of the pellets (See FIG. 2) functions as a dense core having a compression strength large enough to withstand the above pressurizing, whereas the graphite layer 3 on the outer peripheral side functions to improve sliding performance of the valve shaft 52. That is, the graphite layer 3 of the pellets is pressed against the outer peripheral surface of the valve shaft 52 so that the valve shaft 52 slides relative to the graphite layer. Since the graphite layer 3 has a low frictional resistance, the composite ceramic pellet will not scrape or prohibit movement of the valve shaft 52. Thus, smooth movement of the valve shaft 52 is assured. The discrete composite ceramic materials may be widely applicable to an arbitrary sealing diameter and an arbitrary sealing shape.

In FIGS. 7A through 7C, the sealed portion is constituted in the state that the discrete composite ceramic material is kept pressurized. Such a sealed portion is generally exchanged with a fresh one, for example, at a cycle of 2 to 5 years through periodical decomposition inspection. At that time, the bolts 56 are loosened to remove the pressing member 55, the solid mass of the composite ceramic material is exposed and crushed with an acute jig, and the crushed matter can be easily removed from the seal casing 53 by applying suction with an appropriate suction unit (not shown). The ceramic grains of the removed composite material can be used again by fractioning and separating the ceramic grains, resulting in reuse of the resources. This also leads to a decrease in cost of the sealing member. For this reason, the discrete composite ceramic material provides a useful value of recycling. After the removal of the used material, fresh, discrete composite ceramic material is filled in the seal space, which are then pressed by the pressing member 55 as mentioned above.

If the graphite layer 3 is too thin, the surface of the ceramic grain 2 is likely to be exposed through the fracture of the graphite layer 3 during sliding with the valve shaft 52 or the like so that the composite ceramic grain is likely to scrape against the valve shaft 52 when the valve shaft moves. Thus, the thickness of the graphite layer 3 is preferably equal to or greater than one-half the diameter D of the ceramic grain 2 as mentioned above. On the contrary, if the graphite layer 3 is too thick and the size of the ceramic grain 2 is made too small, workability of setting the packing is likely to be deteriorated. Thus, it is preferable that the diameter of the ceramic grain 2 is not less than 0.5 mm, for example 3 mm.

FIG. 8 shows an example of an application of the present invention to a sealed portion of a pump. In this embodiment, a given amount of composite ceramic pellets are filled in a cylindrical sealing space between a seal casing 61 and a rotary shaft 62, and a pressing jig 63 keeps the composite ceramic pellets in a pressed state between the pressing jig 63 and an end ring 65 by tightening bolts 64 into the seal casing 61. In this state, a sealing function is exhibited in the same manner as in the embodiment of FIGS. 7A through 7C. In particular, when the rotary shaft 62 is rotated, excellent sliding performance can be obtained with the graphite layer 3 of the composite ceramic grains CB. Thus, smooth rotation of the rotary shaft 62 is guaranteed, free from scraping against the composite ceramic pellets.

In the following, composite ceramic pellets CB as obtained above were used in packings for various valves in a thermal power plant, and their sealing performance was examined. Test results are shown in Table 1. The terms "main steam line", "extraction steam line", "reheating steam line" and "feed water line" of the thermal power plant in the left column of Table 1 are defined below, and sealed portions were applied to valves in the main steam line and the extraction steam line, respectively.

Main steam line—piping line for feeding superheated steam generated in boiler to turbine Reheating steam line—piping line for extracting steam from outlet of high pressure turbine, reheating it in a reheater of a boiler to raise superheated degree, and continuing expansion of steam by returning steam to turbine Feed water line—piping line for feeding water to be changed to steam in boiler Extraction steam line—piping line for extracting steam from turbine to plural locations and heating water fed to boiler by extracted steam

TABLE 1

|  | Operating conditions | | Fastening bearing stress (Kgf/cm$^2$) |
| --- | --- | --- | --- |
|  | Temperature (°C.) | Pressure (Kgf/cm$^2$) |  |
| Main steam line | 410–575 | 70–250 | 500 |
| Reheating steam line | 360–575 | 30–50 | 400 |
| Feed water line | 170–360 | 6–280 | 500 |
| Extraction steam line | 100–450 | 1–130 | 400 |

Packings (Sealing members) used in the tests were as follows:

(1) Asbestos packing (conventional product)

Packing obtained by shaping a middle core through kneading and molding asbestos fibers together with graphite and plastic, braiding asbestos threads reinforced with a heat-resistive alloy around the middle core in a square shape, and treating the surface of braided matter with graphite.

(2) Non-asbestos packing (Reference sample)

1) Packing formed by laminating expanded graphite sheets in which thin Inconel metallic wires are arranged and shaping the laminate in a ring-like shape (used in main steam line and feed water line).

2) Packing obtained by braiding expanded graphite thread reinforced with Inconel wire and treating surface of the braided matter with graphite.

(3) Sealing portion using composite ceramic grains CB as shown in FIGS. 7C (Present Invention)

Test items and test results are given in Table 2.

TABLE 2

| Item | | | Testing method | Test results | | |
| --- | --- | --- | --- | --- | --- | --- |
|  |  |  |  | Asbestos packing system | Non-asbestos packing system | Invention packing system |
| Sealing performance |  |  | Appearance observed | 23/30 tested valves (77%) | 0/30 tested valves (0%) | 0/30 tested valves (0%) |
| Short-term test | Residual bearing stress Kgf/cm$^2$ | Initial bearing stress 500 | Measured torque of tightening bolt of valve $\sigma_p = 10T/d_b/S$ | 220 (44.3%) | 360 (72%) | 430 (86%) |
|  |  | Initial bearing stress 500 | $\sigma_p$: fastening bearing stress T: torque of packing set bolt $d_b$: diameter of packing | 176 (44.1%) 155 (31.0%) | 203 (55.7%) 300 (60.0%) | 360 (90%) 400 (80%) |
| Long-term test | Residual bearing stress Kgf/cm$^2$ | Initial bearing stress 500 | set bolt S: packing area | 56 (14.0%) | 164 (41.0%) | 300 (75%) |
|  |  | Initial bearing stress 400 |  |  |  |  |
| Sliding resistance |  |  | Number of poorly operated actuators (motor-valve) | 5/30 tested valves (16.7%) | 3/30 tested valves (10%) | 0/30 tested valves (0%) |
| Weight reduction rate (weight change) |  |  | Change in weight between before assembling and after extraction | *short: 8.05% **long: 7.45% | short: 1.05% long: 1.22% | short: 0.98% long: 1.02% |
| Handling performance |  |  | Measured extracting time | short: 18.8 min. long: 21.6 min. | short: 7.2 min. long: 10.8 min. | short: 3 min. long 4 min. |
| Corrosion |  |  | Appearance observed | no abnormality | no abnormality | no abnormality |

Note
*short-term test
**long-term test

In Table 2, the "Sealing performance" denotes the number of the valves requiring periodic refastening of its pressing member. It is seen that nearly 80% of the valves with the asbestos packings needed to be refastened.

Next, a residual bearing stress was determined by measuring a torque of a packing set bolt according to a calculating equation in Table 2. A short term test was effected for 300 days, and a long-term test was effected for 700 days. From the results, it is seen that the reduction in the bearing stress is highest in the asbestos packing system and high in the non-asbestos packing system, while reduction in the bearing stress of the invention packing system is the lowest.

With respect to the sliding resistance, the number of the valves exhibiting poor operation was examined. Table 2 shows the number of the valves which could not be operated unless the bearing stress of the sealed portion was loosened, because of poor operation. From this, it is clear that the sealed portion of the present invention had smaller sliding resistance and excellent operability.

Further, a weight reducing rate was smallest in the case of the sealing portions of the present invention. In order to further examine the handling performance, the time required for the sealing member to be taken out was measured. The terms "Short" and "Long" are abbreviations of the short-term test and the long-term test, respectively. It took the longest time for the asbestos packing system to be removed. Since the non-asbestos packing system has the number of rings being a half of the asbestos packing system, the extracting time is accordingly reduced. On the other hand, it is seen that the sealing portion according to the present invention could be taken out in a short time period of 3 to 5 minutes, being half the time in the case of the asbestos packing system. With respect to corrosion property, no abnormalities were observed in the packing systems including the invention samples.

Further, various other types of discrete composite materials according to the present invention were prepared, in which ceramic, metal, plastic, and graphite materials were employed as the core (inner portion). Also, a sample was prepared wherein the entire portion was made of natural carbon according to the method of the present invention.

Then, each of these types of the discrete composite materials was subjected to the test described in connection with FIG. 8 with respect to the sealing performance, the sliding performance, and the fastening bearing stress. As a result, it was revealed that these types of discrete materials can be used as sealing materials under limited conditions. The results are as follows:

(1) The discrete composite material in which ceramic was employed as the core material exhibited excellent sealing performance, excellent sliding performance, and excellent fastening bearing stress at both room temperature and high temperature (300° C.).

(2) The discrete composite materials in which metal was employed as the core material exhibited excellent sealing performance and excellent fastening bearing stress at both room temperature and high temperature (300° C.). However, although the sliding performance was excellent at room temperature, it was poor at 300° C.

(3) The discrete composite materials in which plastic was employed as the core material exhibited excellent sealing performance, excellent sliding performance, and excellent fastening bearing stress at room temperature, but sealing performance, sliding performance and fastening stress were poor at 300° C.

(4) The discrete composite materials in which graphite was employed as the core material exhibited excellent sealing performance, excellent sliding performance, and excellent fastening bearing stress at both room temperature and a high temperature (300° C).

(5) The discrete materials which were entirely made of natural carbon exhibited excellent sealing performance and excellent fastening bearing stress at both room temperature and high temperature, but its sliding performance was diminished at both room temperature and 300° C.

Further, the compression strength of these small discrete composite materials (1), (2), (3) and (4) were as follows:
(1) not less than 20,000 kg/cm$^2$
(2) not less than 4,000 kg/cm$^2$
(3) not less than 500 kg/cm$^2$
(4) 300 to 650 kg/cm$^2$ According to the sealing member and the sealed portion-forming method of the present invention, the sealed portion is simply formed by filling discrete ceramic materials comprising pellets in the space to be sealed and pressing the ceramic materials in this space. The packing repair working can be simple and working time is shortened, and an arbitrary shape and an arbitrary size of the sealed portion may be easily obtained. Therefore, many pre-formed packings need not be prepared or stocked. Since no asbestos is used, the sealing member is used safely. Furthermore, since thermal deterioration is slight in the sealing portion at high temperature, the residual bearing stress can be maintained over a long term period. Further, the shaft is subjected to less corrosion and abrasion.

Additionally, as compared with a seal formed by charging powdery carbon and compressing, the small discrete materials according to the present invention have the merits of: (1) improved workability in the formation of the seal, (2) improved compression factor (i.e., as high as 40% as compared to 10% of powdery carbon), and (3) improved acid resistance by the use of the binder.

We claim:

1. A sealing member, comprising:
a discrete material including a plurality of individual pellets, each pellet comprising a core and a carbon based coating thereon, said carbon based coating having a thickness of not less than one-half a diameter of the core, and said plurality of individual pellets being aggregated and pressed together.

2. The sealing member of claim 1, wherein the cores comprise a ceramic material.

3. The sealing member of claim 1, wherein the cores comprise a metal material.

4. The sealing member of claim 1, wherein the cores comprise a plastic.

5. The sealing member of claim 1, wherein the cores comprise carbon.

6. The sealing member of claim 1, wherein the cores are substantially spherical.

7. The sealing member of claim 6, wherein the cores have a diameter not less than 0.5 mm.

8. The sealing member of claim 1, wherein said pellets have a diameter not greater than 15 mm.

9. The sealing member of claim 8 wherein said pellets have a diameter within a range of 1 to 12 mm.

10. A method for forming a sealing member, comprising the steps of:

providing a discrete material including a plurality of individual pellets, each pellet comprising a core and a carbon based coating thereon, said carbon based coating having a thickness of not less than one-half a diameter of the core;

filling the discrete material in a space; and pressing said discrete material to form the sealing member.

11. The method of claim 10, wherein the cores comprise a ceramic material.

12. The method of claim 10, wherein the cores comprise a metal material.

13. The method of claim 10, wherein the cores comprise a plastic.

14. The method of claim 10, wherein the cores comprise carbon.

15. A discrete material for forming a sealing member, comprising:

a plurality of pellets, each pellet comprising a ceramic core and a carbon based material coating which envelops said ceramic core, wherein the carbon based coating has a thickness of not less than one-half a diameter of the core.

16. The discrete material of claim 15, wherein the cores are substantially spherical.

17. The discrete material of claim 16, wherein the cores have a diameter no less than 0.5 mm.

18. The discrete material of claim 15, wherein said pellets have a diameter not greater than 15 mm.

19. The discrete material of claim 18, wherein said pellets have a diameter within a range of 1 to 12 mm.

* * * * *